Aug. 7, 1945.　　　　R. J. BUSH　　　　2,381,203
FLUID PUMP CONTROL
Filed April 28, 1942　　　　3 Sheets-Sheet 1

INVENTOR
Rankin J. Bush
BY
ATTORNEY

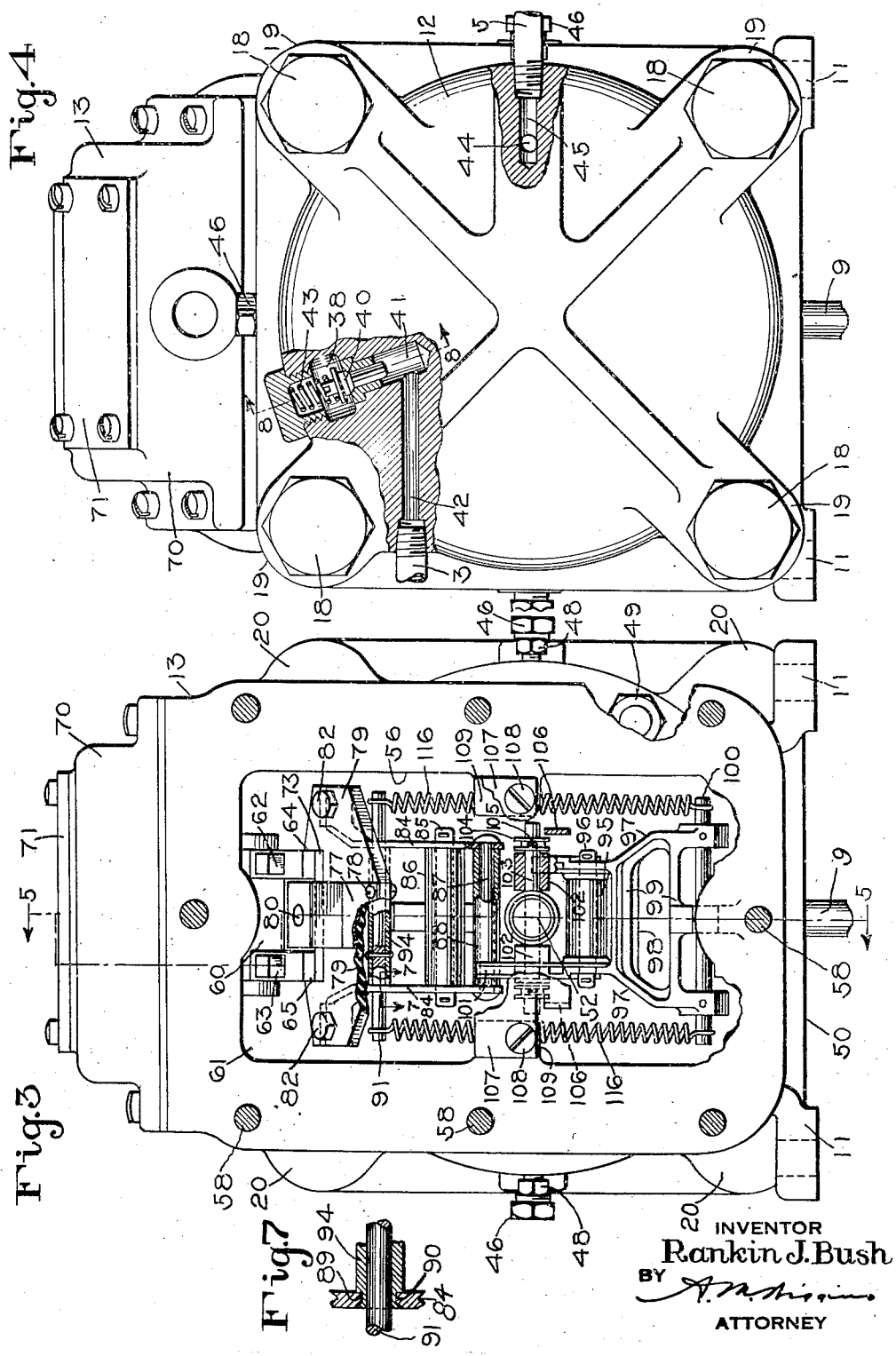

Aug. 7, 1945. R. J. BUSH 2,381,203

FLUID PUMP CONTROL

Filed April 28, 1942 3 Sheets-Sheet 3

INVENTOR
Rankin J. Bush
BY
ATTORNEY

Patented Aug. 7, 1945

2,381,203

UNITED STATES PATENT OFFICE 2,381,203

FLUID PUMP CONTROL

Rankin J. Bush, Jeannette, Pa., assignor to The Westinghouse Air Brake Company, Wilmerding, Pa., a corporation of Pennsylvania Application April 28, 1942, Serial No. 440,823

6 Claims. (Cl. 200—67)

This invention relates to fluid pump control and more particularly to means for controlling fluid or hydraulic pressure for use in a control system such, for example, as a hydraulic brake system.

In a control system such as a hydraulic brake system it is customary to store, in what is commonly known as an accumulator, a supply of liquid under pressure for use in applying brakes. A pump of suitable structure is used for charging the accumulator with liquid under pressure and means are usually provided for so controlling the pump as to limit the amount or pressure of liquid maintained in the accumulator.

One object of the invention is the provision of an improved arrangement for governing the fluid pressure supply for use in a system such as above described.

Another object of the invention is the provision of an improved liquid pressure supply arrangement so constructed and arranged as to cause operation of the liquid pump only as required to maintain the amount or pressure of stored liquid between chosen limits.

Another object of the invention is the provision of an improved liquid pressure accumulator for a hydraulic control system.

Another object of the invention is the provision of improved fluid pressure controlled means for controlling the starting and stopping of an electrically driven pump as required to maintain a chosen reserve of fluid under pressure for use in a system such as above referred to.

Still another object of the invention is the provision of a hydraulic control system embodying an accumulator, an electrically driven pump for displacing liquid under pressure into said accumulator and means operative in accordance with the pressure or amount of liquid in the accumulator to start and stop the pump as required to maintain such pressure or amount within chosen limits.

Other objects and advantages will be apparent from the folowing more detailed description of the invention.

Figure 2:
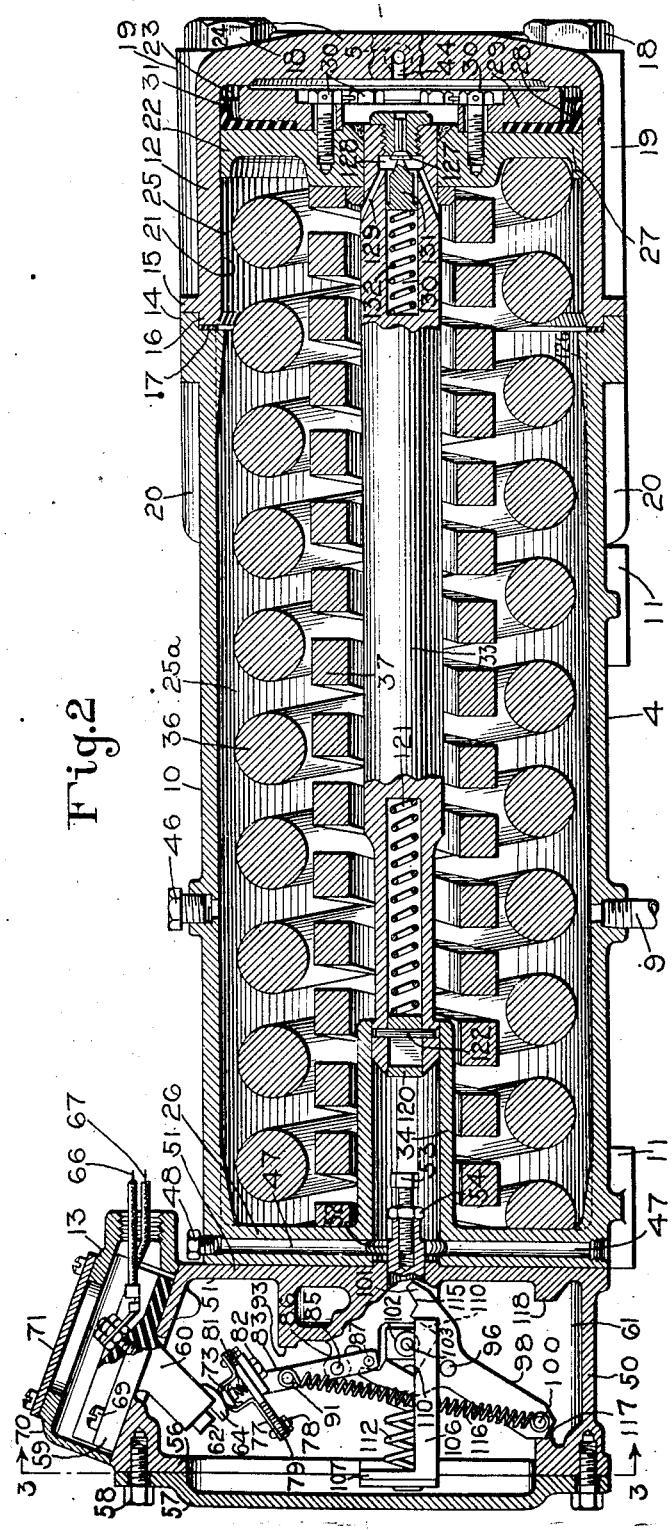
Figure 1:
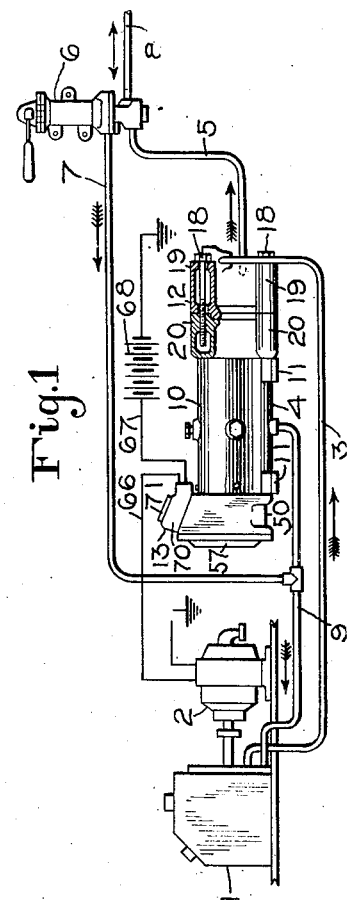
Figure 5:
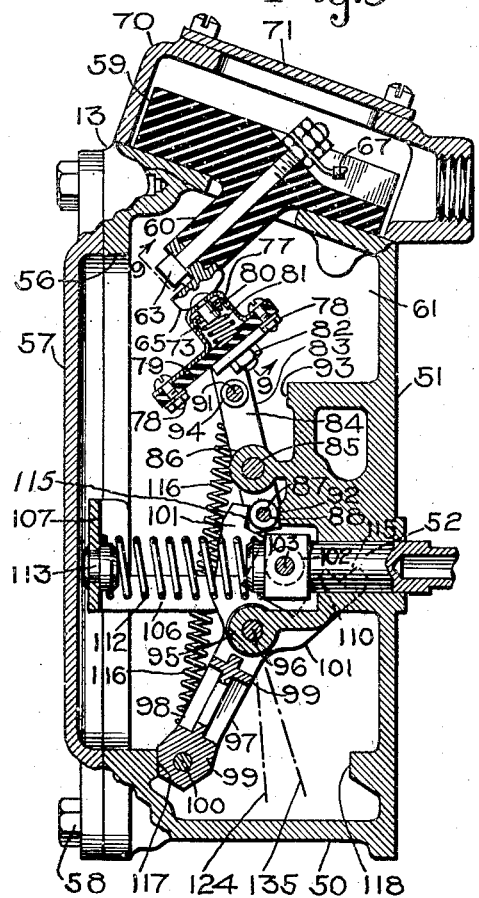
Figure 6:
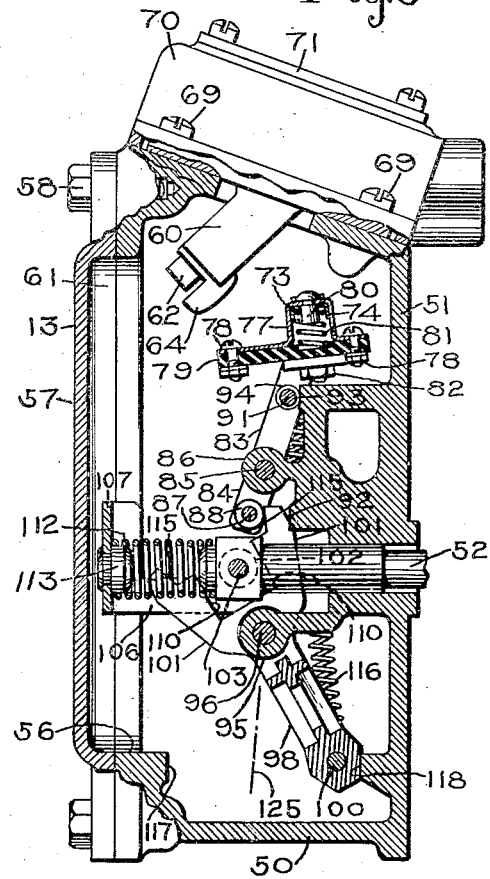
Figure 9:
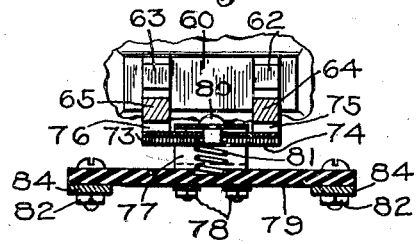
Figure 8:
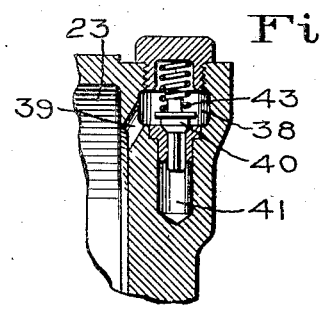

In the accompanying drawings; Fig. 1 is a diagrammatic view, mainly in outline, of a fluid pressure control system embodying the invention; Fig. 2 is a sectional view on an enlarged scale taken longitudinally through a pressure accumulator shown in elevation in Fig. 1; Fig. 3 is a sectional view on an enlarged scale taken on the line 3—3 at one end of the accumulator shown in Fig. 2; Fig. 4 is an end view on an enlarged scale and partly in section of the right-hand end of the accumulator shown in Fig. 2; Fig. 5 is a sectional view taken mainly on the line 5—5 in Fig. 3 and showing parts of a pump control device in a position for causing operation of the pump; Fig. 6 is a view similar to Fig. 5 but with the parts of the pump control device in the position for stopping operation of the pump; and Figs. 7 to 9 are sectional views taken on the lines 7—7, 8—8, and 9—9, in Figs. 3 to 5, respectively.

*Description*

In Fig. 1 the reference numeral 1 indicates a liquid sump or reservoir for containing a quantity of liquid such as oil and which may also contain a liquid pump (not shown) arranged for operation by an electric motor 2 to draw oil from the sump and displace same under pressure through a discharge pipe 3 into an accumulator 4. The accumulator, which will hereinafter be described in detail, embodies means controlled by the amount or pressure of liquid provided therein by the pump for controlling the operation of the motor 2 to thereby cause operation of the pump only as required to maintain the quantity or pressure of liquid in the accumulator between certain chosen limits.

The reference numeral 5 indicates a liquid pressure supply pipe through which liquid under pressure is arranged to flow from the accumulator 4 to a control valve device 6 which is manually operative to selectively control communication between the supply pipe 5, a release pipe 7, and a pipe 8 which leads to a device to be hydraulically controlled, such as a brake cylinder device (not shown) of a brake system. When the control valve device 6 connects pipes 5 and 8, liquid under pressure will flow from the accumulator 4 to the brake cylinder device to cause an application of brakes, and when the control valve device connects pipes 8 and 7, liquid under pressure in the brake cylinder device will be released to effect a release of brakes. Liquid under pressure thus released from pipe 8 to pipe 7 will return through the latter and a pipe 9 to the sump 1, as will be apparent from an inspection of Fig. 1.

In practice, the accumulator 4, which embodies the invention, is arranged to provide a constant reserve of liquid under pressure which is instantly available to effect an application of brakes or other selected operation upon suitable operation of control valve device 6. Further, the capacity of the accumulator is preferably such as to provide for several applications of brakes without being recharged by the pump, so as to insure adequate or safe braking of a vehicle for a certain period of time when, for any reason, the pump fails.

The accumulator 4 comprises a relatively long, central, cup-shaped mounting or base portion 10 having suitable mounting lugs 11, a relatively short liquid reservoir or cylinder portion 12 also cup-shaped and disposed at the open end of the central portion 10 in coaxial relation, and a motor control portion 13 mounted on and carried by the closed end of the central portion 10. The adjacent open ends of the portions 10 and 12 are provided with external annular ribs 14 and 15, respectively, which engage each other. The internal surface of the rib 14 defines a recess into which projects a tongue 16 provided on the end of the reservoir portion 12 and interposed between this tongue and the bottom of the recess is a gasket 17 which, when the parts 10 and 12 are secured together in the manner hereinafter described, is compressed to produce a seal which will prevent seepage of oil through the joint between the two parts. The two parts 10 and 12 of the accumulator are rigidly secured together with the ribs 14 and 15 in contact with each other by means of a plurality of cap screws 18 which are equally spaced from each other around said parts and which extend through suitable bores provided in bosses 19 on the reservoir portion 12 and have screw-threaded engagement in aligned bosses 20 provided on the adjacent end of the central portion 10. This metal to metal contact between the ribs 14 and 15 serves to limit the pressure to which the sealing gasket can be subjected to by the parts 10 and 12 thereby guarding the gasket against damage.

The reservoir portion 12 is provided interiorly with a finished or machined bore 21 in which is slidably mounted a piston 22 which separates a pressure chamber 23, defined by the inner surface of the bore, the closed end wall 24 of the reservoir portion and the piston, from a non-pressure chamber 25 at the opposite side of the piston which is open to a chamber 25a extending through the central portion 10 of the accumulator to the end wall 26 thereof. The central portion 10 of the accumulator is provided with four drain openings to the lowermost of which the pipe 9 is connected in order that any liquid which may enter chamber 25a may drain to the sump 1. The other three openings are closed by plugs 46.

The piston 22 comprises a piston head 27 having sliding contact with the bore 21 and further comprises a flexible packing cup 28 which is secured to the face of said head adjacent the closed end wall 24 of the reservoir portion by a suitable follower 29 and cap screws 30. The packing 28 has a skirt portion 31 which encircles the follower 29 and contacts the wall of the bore 21. This skirt is adapted to be forced into sealing contact with the wall of the bore by liquid pressure effective in the pressure chamber 23 in order to prevent leakage of such liquid pressure past the piston to chamber 25a at the opposite face thereof.

The piston head 27 carries one end of a piston rod 33 which extends through chamber 25 and into chamber 25a. The opposite end of rod 33 is supported in a bore provided in a boss 34 projecting into chamber 25a centrally from the end wall 26 of the central portion 10 of the accumulator. The end wall 26 has a plurality of spaced radially extending passages 47 opening into the outer end of the bore in boss 34. The outer end of each of these passages is closed by a plug 48, except the lowermost passage which is effective to allow drainage of any oil from the bore within boss 34 which may gain access thereto from chamber 25a past the piston rod 33.

Two coil springs 36 and 37, arranged one within the other and encircling the piston rod 33 and the boss 34, extend through the chambers 25 and 25a and bear at one end against the piston head 27 and at the opposite end against the end wall 26 of the central portion 10 of the accumulator. These springs are under a chosen degree of pressure for opposing movement of the piston 22 away from the closed end wall 24 of the reservoir portion 12 of the accumulator. The initial compression of the springs is effected by the reservoir portion 12 as such portion is drawn into working relation with the central portion 10 of the accumulator by means of the cap screws 18, in which relation the ribs 14 and 15 engage each other as above described and thereby limit the initial compression of the spring.

The closed end wall 24 of the reservoir portion 12 has a chamber 38 which is open through a port 39 to the pressure chamber 23 and also through bores 41 and 42 to the supply pipe 3 from the liquid pump disposed in the sump 1 so that upon operation of said pump liquid discharged thereby will flow into the pressure chamber 23 at one side of the accumulator piston 22. The chamber 38 contains a check valve 40 arranged to permit flow of liquid from the pump to chamber 38 and accumulator piston chamber 23 but to prevent flow in the opposite direction. A spring 43 in chamber 38 acts on the check valve 40 to urge same to its seated position shown.

The end wall 24 of the reservoir portion 12 is also provided with a bore 44 open at one end to the pressure chamber 23 and at the opposite end to a bore 45 which is connected to the liquid supply pipe 5 leading to the manually operative control valve device 6 for supplying liquid under pressure from the pressure chamber 23 to said valve device.

From the above description of the accumulator it will be seen that when the motor 2 is operating to operate the pump within the reservoir or sump 1 to pump liquid under pressure into the discharge pipe 3, such liquid will flow past the check valve 40 into pressure chamber 23 and therein act on the piston 22 in opposition to the combined pressures of springs 36 and 37. When the pressure of liquid in pressure chamber 23 is thus increased to a degree sufficient to overcome the opposing pressure of springs 36 and 37, the piston 22 will move in the direction of the left-hand, as viewed in Fig. 2, and this movement will continue as long as the pump continues to operate and force liquid into the pressure chamber 23.

It is intended that the piston 22 will be thus moved in the direction of the left-hand for about two-thirds, three-quarters or any other desired portion of the length of bore 21 at which time it is desired to stop the pump and for this purpose the motor control portion 13 is provided on the opposite end of the accumulator. The motor control portion 13 is also arranged to maintain the pump stopped until after a certain portion of the liquid under pressure has been used from the pressure chamber 23, which results in a certain movement of piston 22 from the position in which it was stopped, back in the direction of the right-hand, at which time the motor control portion 13 is arranged to operate to again cause operation of the pump to replenish the liquid thus used from the pressure chamber 23. It will thus be seen that with the pressure chamber 23 connected to the manual control valve device 6, a constant supply of liquid under pressure will be available at said device for controlling the brakes.

The amount of liquid under pressure stored in the accumulator at the time the motor control portion 13 operates to stop the pump is also intended to provide for several brake applications by operation of the manual control device 6 without any operation of the pump, so as to thereby insure adequate and safe control of the vehicle in case of failure for any reason of further supply of liquid under pressure to the accumulator.

From the above description it will be noted that operation or movement of the piston 22 is confined to within the finished or machine bore 21 of the reservoir portion 12. The substantially aligned wall of chamber 25a in the central portion 10 of the accumulator need not therefore be machined or finished, and neither is it necessary that this wall be as thick as that of the reservoir portion 12 since it is never subjected to the bursting pressure of liquid in chamber 23. This wall need only be sufficiently rigid to support the reservoir portion 12 at one end and the motor control portion 13 at the opposite end and to also support the springs 36 and 37 against their expansive force on end wall 26.

The motor control portion 13 above-mentioned comprises a rectangular casing 50 having a back wall 51 mounted against and rigidly secured by screws 49 to the outer face of the end wall 26 of the central portion 10 of the accumulator. The wall 51 is solid except for a relatively long bore provided in coaxial relation with the piston rod 33 and in which is slidably mounted a control plunger 52. This plunger extends into the bore provided in boss 34, in which boss, the end of the piston rod 33 is mounted. Within the boss 34 the plunger is provided with an adjusting member 53 having screw-threaded engagement with the plunger. The adjusting member is locked in an adjusted position by a lock nut 54 carried thereby and jammed against the end of the plunger.

The front of the casing 50 is provided with an opening which is encircled by a rib 56 having a relatively wide sealing surface for sealing engagement with a like surface on a cover 57 which is mounted over said opening and secured to the casing by cap screws 58.

A block 59, made of any suitable electrical insulating material, is secured to the top of the casing 50 by screws 69 and has a boss 60 extending from its lower face through a relatively small opening in the top wall of the casing into chamber 61 formed within the casing. A relatively wide area of sealing contact is provided all around the boss 60 between the block 59 and casing 50 as will be seen from the drawings.

Mounted against the end of boss 60 within chamber 61 are two fixed electrical contacts 64 and 65. These contacts are spaced and thus insulated from each other and are rigidly held in place by two spaced terminal bolts 63 and 62 which extend through the contacts, boss 60 and block 59 to the exterior face of said block. The outer end of the terminal bolt 62 is connected to a wire 66 which leads to the electric motor 2 while the outer end of the other terminal bolt 63 is connected to a wire 67 which leads to any suitable source of electric power such as a battery 68.

The block 59 is contained in a housing 70 secured to the top of casing 50 and said housing is open at its top to provide for connecting wires 66 and 67 to the terminals screws 62 and 63, this opening being closed by a removable cover 71.

Within chamber 61 is a contact member 73 comprising a channel shaped element 74 and contacts 75 and 76 secured to the opposite ends of said element, these contacts being spaced to engage the fixed contacts 64 and 65, respectively (Fig. 9). The movable contact member 73 is slidably mounted for movement in the directions toward and away from the fixed contacts 64 and 65 and is located between the opposite sides of a U-shaped retainer 77 which straddles the channel shaped element 74 extending between the contacts 75 and 76, and which is secured by bolts 78 at its opposite ends to a carrier 79 made from any suitable insulating material. A button 80, secured by riveting to the retainer 77, extends through a bore in the channel shaped element 74 midway between its ends and into the end coils of a spring 81 which is interposed between the channel shaped element 74 and carrier 79, which spring is for the purpose of urging said element in the direction of the closed end of carrier 79 and thereby in the direction of the fixed electric contacts 64 and 65, with the parts as shown in Figs. 2, 5, and 9.

The opposite ends of the carrier 79 are secured by bolts 82 to one end of a lever member 83 comprising two like and oppositely disposed, spaced levers 84 which intermediate their ends, are pivotally mounted on a pin 85 carried by a boss 86 which projects from the back wall 51 of the casing into chamber 61, the boss and pin being located above the plunger 52. The opposite ends of the two levers 84 are rigidly connected together in spaced relation by a rivet 87 which extends through a spacer sleeve 88 extending between the two levers and with its opposite ends engaging the adjacent sides of said levers. Above the fulcrum pin 85 and thus on the side of said pin opposite the spacer sleeve 88, the two levers 84 are also rigidly connected in spaced relation by a sleeve 94 having at its opposite ends shoulders 89 for engaging the adjacent faces of said levers and also having at its opposite ends reduced portions 90 which extend through aligned bores in said levers, the ends of such portions being riveted over against the outer face of the levers as shown in Fig. 7. The sleeve 94 carries a shaft 91 which extends beyond the opposite ends of the sleeve for reasons which will hereinafter be brought out.

Below boss 86 and projecting from the end wall 51 of the casing is a stop 92 arranged for engagement by the sleeve 88 for limiting counter-clockwise movement of the lever member 83 about pin 85 to a position in which the movable contact member 73 electrically connects the fixed contacts 64 and 65, as shown in Figs. 2, 5 and 9. Above the boss 86 the wall 51 of the casing has a stop 93 arranged for engagement by the sleeve 94 for limiting clockwise movement of the lever member to a circuit opening position shown in Fig. 6 in which the contact member 73 is disengaged from the fixed contacts 64 and 65.

Below the plunger 52 the end wall 51 of the casing has a boss 95 extending into chamber 61 and carrying a fulcrum pin 96 on the opposite ends of which are pivotally mounted two side pieces 97 of a lever member 98. Below the fulcrum pin 96 the two side pieces 97 are integrally connected by suitable bridge pieces 99, and an operating pin 100 extends through spaced lugs depending from the lower one of these pieces, the pin projecting beyond the outer faces of the two end lugs as shown in Fig. 3.

Above the fulcrum pin 96 each of the side pieces 97 has a pair of spaced jaws 101 opening in a generally upward direction. Within each pair of jaws 101 is a roller 102, the two rollers being disposed at opposite sides of the end of plunger 52 which projects into chamber 61 and being carried on a pin 103 extending through the rollers and the end of said plunger. Beyond each of the rollers a washer 104 is secured by a cotter key 105 to the pin 103 for holding the rollers in place. The pin 103 extends beyond each of the washers 104 to a position above an arm 106 which extends parallel to the axis of the plunger 52. The two arms 106 project from a member 107 which is secured by screws 108 to two ears 109 projecting inwardly toward each other from the opposite side portions of rib 56 engaged by the cover 57.

It will be seen that engagement between pin 103 and one or the other arm 106 will act to limit turning of the plunger 52 in its bore through the back wall 51 of the casing and thus maintain the rollers 102 in operative relation to the jaws 101 of the lever member 98. By this structure embodying arms 106 it will be seen that the bore, in which the plunger 52 is slidably mounted, may be unbroken throughout its length to thereby provide a relatively long gas and fire tight seal between the plunger and casing.

A spring 112 in chamber 61 is interposed between the end of plunger 52 and member 107 for urging said plunger in a direction out of said chamber toward the accumulator piston 22, the end of the spring engaging member 107 being supported on a boss 113 secured to said member by riveting.

Each pair of jaws 101 of the lever member 98 is provided with two oppositely arranged operating surfaces 110 between which the respective roller 102 is mounted. These surfaces in both pairs of jaws are provided for engagement by the rollers 102 upon movement of the plunger 52 in either one direction or the other for controlling operation of the lever member 98. Beyond the surfaces 110 each pair of jaws 101 is also provided with two oppositely arranged operating surfaces 115 for engagement with sleeve 88 provided in the lower end of the lever member 83, engagement between said sleeve and either one or the other of these surfaces being operative to actuate the lever member 83.

Two oppositely arranged stops 117 and 118 are provided for engagement by the lever member 98 to define two different spaced operating positions thereof shown in Figs. 2, 5, and 6.

The ends of the pins 91 and 100 projecting beyond the lever members 83 and 98 are connected together by two parallel arranged springs 116 which are under tension. The fulcrums and position defining stops, above described, for the lever members 83 and 98 are so arranged that these springs will act either at one side or the opposite side of said fulcrums for urging said lever members either to a circuit closing position defined by stops 92 and 117 as shown in Figs. 2 and 5, or to a circuit opening position defined by stops 93 and 118, as shown in Fig. 6.

A plunger 120 is slidably mounted in a bore in the end of the piston rod 33 and also contained in this bore and acting on the inner end of the plunger is a coil spring 121 urging the plunger outwardly of said rod with a greater degree of pressure than the pressure of spring 112 on the plunger 52. The plunger 120 is provided with a diametrical slot and through this slot and the side walls of the piston rod 33 a pin 122 is provided for limiting movement of the plunger outwardly of said rod.

*Operation*

In operation, let it initially be assumed that the accumulator piston 22 and the parts of the motor control portion 13 of the accumulator are in the circuit closing positions as shown in Figs. 2, 5, and 9. Under this condition the lines of action of springs 116 are at the left-hand side of fulcrum pins 96 and 85 of lever members 98 and 83 thus biasing said members into contact with their respective stops 118 and 92. In this position of lever member 83 the movable contacts 75 and 76 are in engagement with the fixed electric contacts 64 and 65 thereby closing the circuit between the battery 68 and motor 2 for causing operation of said motor.

Operation of the motor 2 and thereby of the pump in the sump or reservoir 1 causes liquid to be displaced through pipe 3 and thence past the check valve 40 in the closed end wall 24 of the reservoir portion 12 into the pressure chamber 23 wherein it acts on the piston 22 in opposition to the pressure of springs 36 and 37. When a sufficient amount of liquid has thus been forced into the pressure chamber 23 to create a pressure on the piston which exceeds that of the springs 36 and 37 said piston will be caused to move in the direction of the left-hand, as viewed in Fig. 2, and such movement will continue as long as the pressure of liquid in chamber 23 continues to be increased by operation of the motor 2 and liquid pump.

After a certain degree of movement of piston 22 by liquid supplied to pressure chamber 23 the plunger 120 in the end of the piston rod 33 contacts the adjusting screw 53 in the end of plunger 52 so that further movement of the piston against the springs 36 and 37 then moves the plunger 52 into chamber 61 of the motor control portion 13. This movement of plunger 52 is initially relative to the lever member 98, but after a certain degree of such movement the rollers 102 carried by said plunger contact the left-hand surfaces 110 of jaws 101 so that further movement of the plunger then acts to rock the lever member 98 in a counterclockwise direction about its fulcrum pin 96 against the opposing force of springs 116, which force also continues to act to maintain the movable contacts 75 and 76 in circuit closing relation with the fixed contacts 64 and 65.

When the lever member 98 is thus rocked to a position such as indicated by a broken line 124 in Fig. 5, the lines of action of springs 116 intersects the axis of the fulcrum pin 96 for said member and upon slight further movement of said member the lines of action of said springs passes to the right-hand side of the axis of fulcrum pin 96, whereupon the force of said springs becomes effective to rotate the lever member 98 relative to the plunger 52 and into contact with the stop 118. During this movement of plunger 98 under the action of springs 116, the right-hand surfaces 115 in the two pairs of jaws 101 will engage the sleeve 88 in the lower end of the upper lever member 83 in a position of the member 98 such as indicated by a line 135 in Fig. 5, whereupon the combined action of springs 116 and of inertia developed in member 98 while being moved by said springs into contact with the sleeve 88 will act to turn the upper toggle member 83 from the position shown in Fig. 5 against the opposing action of said springs to a position in which the lines of action of said springs passes from the left-hand side of the fulcrum pin 85 as shown in Fig. 5 to the opposite side, at which time said springs will aid the lever member 98 to continue such movement of lever member 83 into engagement with the stop 93. As the lever member 83 is thus operated from the circuit closing position shown in Fig. 5 to the position shown in Fig. 6 the movable contacts 75 and 76 will be moved out of engagement with the fixed contacts 64 and 65 and thereby open the circuit through the motor 2 for stopping said motor and thus the liquid pump in the reservoir 1 so as to terminate the supply of liquid under pressure to the pressure chamber 23.

As liquid under pressure is subsequently used from pressure chamber 23 for controlling brakes or the like, the piston 22 will be moved in the direction of the right-hand by springs 36 and 37, and spring 112 in the motor control portion 13 will correspondingly move the plunger 52 in the same direction along with the piston rod 33. After a certain degree of such movement, which initially is relative to the lever member 98, the rollers 102 carried by the plunger 52 will engage the right-hand surfaces 110 in the jaws 101 of said lever member, so that further movement of the plunger 52 with the piston rod 33 and piston 22 will then rotate said lever member against the opposing force of springs 116 from the position shown in Fig. 6 back toward the position shown in Fig. 5. The line 125 in Fig. 6 indicates the position in which the lines of action of springs 116 will pass through the axis of fulcrum pin 96 for the lever member 98 so that upon movement of said member slightly past the line 125, said springs will become effective to move said member relative to the plunger 52 and back into engagement with the stop 117. Before the lever member 98 engages the stop 117 however the left-hand surfaces 115 in the jaws 101 thereof will engage the sleeve 88 in the lower end of the lever member 83 whereupon the inertia of said member plus the action of springs 116 will rock the lever member 83 from the position shown in Fig. 6 back to its circuit closing position shown in Fig. 5. The motor 2 will be then caused to again operate the pump in the reservoir 1 to replace the liquid under pressure previously used from pressure chamber 23, whereupon the piston 22 will again be moved in the direction of the left-hand and in so moving operate the motor control portion 13 of the accumulator to stop the pump and thus the further supply of liquid under pressure to the pressure chamber 23, in the same manner as above described.

From the above description of the motor control portion it will be noted that the lever members 98 and 83 constitute two snap acting devices both preferably, although not necessarily, controlled by common springs 116. The lever member 98 must be moved past its dead center position either by the accumulator piston 22 in one direction or by spring 112 in the other direction before it will snap under the action of springs 116 to either of its opposite positions. The lever member 83 remains in either its circuit opening position or circuit closing position under the action of springs 116 until after the snap action or movement of lever member 98 is obtained to insure positive and snap movement of the lever member 83 from either one of its positions to the other. There is no gradual movement of the lever member 83 out of either of its positions, like occurs with the lever member 98, so that snap opening and closing of the motor circuit is assured and the possibility of burning of the electric contacts minimized. Further, there is substantially no possibility of the lever member 83 ever becoming stuck in dead center as is possible with a structure embodying only one snap acting member like the lever member 98, since its movement is assured if the lever member 98 operates as intended. Failure of the latter for any reason will have no effect upon the position of the lever member 83 thus further minimizing the possibility of partial opening or closing of the switch contacts with attendant burning thereof.

From the above description it will also be seen that after the pressure chamber 23 has initially been charged with a sufficient degree of liquid to actuate the plunger 120 in the end of piston rod 33 into contact with the adjusting screw 53 in plunger 52, the piston 22 will operate or be maintained between this position and the position of maximum charge in which the motor control portion 13 operates to stop the pump, so long as the system is operating as intended.

The volume of pressure chamber 23 is such at the time the motor control portion 13 operates to stop the motor 2 and liquid pump, as to provide for several applications of brakes or the like by operation of the manual control device 6 without further operation of the pump. Thus if for any reason, such as power failure, liquid under pressure used from the pressure chamber 23 should fail to be replaced an adequate margin of safety in the control of the vehicle or device is provided.

This volume of chamber 23 may also be adjusted to suit different requirements by turning the adjusting screw 53 into or out of the plunger 52 so as to provide a greater or less preliminary movement of piston 22 before contact between the plunger 120 in the end of the piston rod 33 and said screw is obtained, as will be apparent.

When the pump is stopped by operation of the motor control portion 13 of the accumulator the piston 22 will occupy a position to the left of that shown but to the right of gasket 17. It will thus be seen that the expansive force of hydraulic pressure in chamber 23 is at all times maintained within the reservoir portion 12 of the accumulator. The central portion 10 of the accumulator is thus never subject to the expansive force of hydraulic pressure and the piston 22 never operates in said central portion. The central portion 10 is subject merely to the expansive force of springs 36 and 37 and the walls thereof may therefore be made thinner than the wall of the reservoir portion 12 and the interior need not even be machined, like the bore 21 in the reservoir portion 12, as before mentioned.

Adjacent the reservoir portion 12 the central portion 10 is however provided with a plurality of inwardly extending ribs or stops 126 for engagement by the left-hand face of piston 22 if for any reason the motor control portion 13 should fail to operate, as above described, to stop the motor 2 and pump within the reservoir 1. Under such a condition it is desirable to relieve the liquid being forced into the pressure chamber 23 at substantially the time the piston 22 engages the stops 126 and for this purpose a check valve 127 arranged in the right-hand end of the piston rod 33 controls a communication between the pressure chamber 23 and a chamber 128 which is open through passages 129 to chamber 25a within the central portion 10, the chamber 25a being in turn open through pipe 9 to the sump or reservoir 1. Back of the check valve 127 the piston rod 23 has a bore 130 containing a plunger 131 acting on the check valve 127 and a spring 132 acting on said plunger for urging the check valve to its closed position shown.

The pressure of spring 132 on the check valve 127 is such as to maintain said valve seated at all times when the pressure of liquid in pressure chamber 23 is below that required to move the piston 22 against the springs 36 and 37 into contact with the stops 126. At substantially the time this greater degree of pressure is however attained, such pressure acting on the check valve 127 will unseat same against the spring 132 to thereby dissipate all further liquid displaced by the pump into the pressure chamber 23 from said chamber into chamber 25a from which it may return through pipe 9 back to the sump so as to prevent further increase in pressure in chamber 23 and possible damage to the device or other parts of the system.

The spring 121 acting on plunger 120 in the piston rod 33 is provided to yield under excess movement of the piston 22 as above described so as to prevent damage to the plunger 52 and other parts of the motor control portion 13, in case for any reason the movement of said plunger into chamber 61, as limited by contact between rollers 102 and the left-hand surfaces 110 of jaws 101, should be insufficient to accommodate the excess movement of the piston 22.

Where an accumulator of this type is associated with a brake equipment to be employed on locomotives such as operate in coal mines which contain explosive gases, it is required that a device like the motor control portion 13, wherein there may be electric sparks or arcing, be totally enclosed in a housing or casing having gas or fire tight seals. This is attained in the present structure by the relatively wide sealing surfaces provided between the casing 50 and the cover 57 and insulating block 59, and by the relatively long unbroken cylindrical contact surface between the plunger 52 and the casing. The unbroken surface between plunger 52 and the casing is attained by the use of arms 4 for holding said plunger against turning instead of some other conventional means such as keys for the same purpose.

Summary

It will now be seen that I have provided an improved fluid pump control for governing the amount or pressure of fluid such as liquid maintained for use in a system such as a hydraulic brake system. The pump control comprises an accumulator consisting of a fluid reservoir portion for storing liquid for use and a motor control portion operative in accordance with the amount of stored liquid to start and stop a pump as required to maintain such amount between chosen limits. Safety arrangements are provided to avoid damage to the accumulator in case an excess amount of liquid is pumped into same which results in greater than normal movement of the piston.

Of importance is the novel construction of the accumulator. It comprises a central portion constituting a mounting base and mounted on one end of this portion is the reservoir portion and on the opposite end the motor control portion. By this arrangement the parts of the accumulator are readily accessible for inspection or repairs. The accumulator piston never moves out of the reservoir portion so that the side wall of the central portion is never subject to the bursting pressure of accumulated liquid pressure. Hence the bore in the central portion need not be finished and the side walls thereof need only be sufficiently strong to support the pressure of the control springs on one end. By this construction the cost and weight of the accumulator are maintained at a minimum.

Also of importance is the construction of the motor control portion which comprises a switch for controlling the motor circuit and a dual snap acting lever arrangement for causing snap or quick and positive operation of the switch in response to relatively slow movements of the accumulator piston.

Having now described my invention, what I claim as new and desire to secure by Letters Patent, is:

1. A device for controlling the starting and stopping of a motor comprising in combination, lever means having a fulcrum and rockable about said fulcrum to either a first position or to a second position, spring means connected to said lever means and so arranged as to oppose movement of said lever means from either of said positions to an intermediate or dead center position with respect to said spring means and being operative upon movement past said dead center position to automatically move said lever means to the other of the two first named positions, actuating means arranged for connection with said lever means to move said lever means from either of the two first named positions past said dead center position, the connection between said actuating means and lever means providing for movement of said lever means relative to said actuating means after movement of said lever means past dead center position by said actuating means; and motor means having a start position and a stop position and operable by said lever means to said start position upon movement of said lever to said first position and operable by said lever means to said stop position upon movement of said lever means to said second position.

2. A device for controlling the starting and stopping of a motor comprising in combination, lever means having a fulcrum and rockable about said fulcrum to either a first position or to a second position, spring means connected to said lever means and so arranged as to oppose movement of said lever means from either of said positions to an intermediate or dead center position with respect to said spring means and being operative upon movement past said dead center position to automatically move said lever means to the other of the two first named positions, actuating means arranged for connection with said lever means to move said lever means from either of the two first named positions past said dead center position, the connection between said actuating means and lever means providing for movement of said lever means relative to said actuating means after movement of said lever means past dead center position by said actuating means; and motor control means comprising a lever member connected to said lever means and having a start position and a stop position and an intermediate position, spring means arranged to oppose movement of said lever member from either said start position or stop position to said intermediate position and being operable upon movement of said lever member past said intermediate position to automatically move said lever member to the adjacent one of said start and stop positions, the connection between said lever means and lever member providing for movement of said lever means relative to said lever member past the dead center position of said lever means, and said lever means being then operable by the respective spring means to move said lever member past its intermediate position, the connection between said lever means and lever member being also arranged to render said lever member movable relative to said lever means by the respective spring means after movement of said lever member past dead center position by said lever means.

3. A control device comprising a first lever and a second lever arranged in substantial end to end relation with their adjacent ends connected, each of said levers having two control positions and an intermediate position, the connection between said levers providing for movement of said first lever relative to said second lever from either of its control positions past its intermediate position and said first lever being then operable to move said second lever from one or the other of its control positions past its intermediate position, and the said connection then providing for movement of said second lever relative to said first lever, spring means connected to said levers opposing movement thereof from either of their control positions past their intermediate positions and being then automatically operable to move said levers to their other control positions, and actuating means arranged to move said first lever from either of its control positions past its intermediate position, the connection between said actuating means and said first lever providing for movement of said first lever relative to said actuating means by said spring means after movement of said first lever past its intermediate position by said actuating means.

4. A control device comprising a fulcrumed lever means and a fulcrumed lever member arranged in substantial end to end relation, stops arranged for engagement by said lever means and lever member in two different operating positions thereof and in each of which positions said means and member are disposed diagonally with respect to each other, resilient means connected to both said lever means and lever member operative in said operating positions to bias same into engagement with their respective stops and also operative to oppose movement out of their operating positions to a dead center position with respect to the line of action of said resilient means, said resilient means being automatically operative upon movement of either said lever means or lever member from either of its operating positions past its dead center position to move same to its other operating position, said lever member having a loose connection with said lever means providing for movement of said lever member relative to said lever means from either of its operating positions past its dead center position, and said lever member being operable by said resilient means upon movement past its dead center position to move said lever means from its corresponding operating position past its dead center position and said loose connection then providing for movement of said lever means by said resilient means relative to said lever member to its other operating position, actuating means having a loose connection with said lever member and operative to move said lever member from either of its operating positions past its dead center position and the loose connection then providing for movement of said lever member relative to said actuating means by said resilient means to its other operating position, and means controlled by said lever means.

5. A control device comprising a fulcrumed lever means and a fulcrumed lever member arranged in substantial end to end relation, stops arranged for engagement by said lever means and lever member in two different operating positions thereof and in each of which positions said means and member are disposed diagonally with respect to each other, resilient means connected to both said lever means and lever member operative in said operating positions to bias same into engagement with their respective stops and also operative to oppose movement out of their operating positions to a dead center position with respect to the line of action of said resilient means, said resilient means being automatically operative upon movement of either said lever means or lever member from either of its operating positions past its dead center position to move same to its other operating position, said lever member having a loose connection with said lever means providing for movement of said lever member relative to said lever means from either of its operating positions past its dead center position, and said lever member being operable by said resilient means upon movement past its dead center position to move said lever means from its corresponding operating position past its dead center position and said loose connection then providing for movement of said lever means by said resilient means relative to said lever member to its other operating position, actuating means having a loose connection with said lever member and operative to move said lever member from either of its operating positions past its dead center position and the loose connection then providing for movement of said lever member relative to said actuating means by said resilient means to its other operating position, and means controlled by said lever means, said resilient means comprising tensioned coil spring means connected at one end to said lever means and at the opposite end to said lever member in such a manner that the line of action of the spring means is disposed at one side of the fulcrum for both said lever member and lever means when in one operating position and at the opposite side when in the other operating position.

6. A motor control device comprising a switch, a toggle lever for actuating said switch, spring means acting on said lever for opposing movement thereof from either of two control positions over a dead center position and then operative automatically to move same to the other control position, a second toggle lever connected to the switch toggle lever and operable to move said switch toggle lever from either of its said control positions past its dead center position, resilient means arranged to oppose movement of said second toggle lever over a dead center position thereof with respect to said resilient means and then operable automatically to move said second toggle lever, the connection between said levers providing for movement of said second toggle lever relative to said switch toggle lever over the dead center position of said second toggle lever and also providing for movement of said switch toggle lever relative to said second toggle lever after movement of said switch toggle lever over its dead center position by said second toggle lever, and actuating means connected to said second toggle lever and operable to move same over its dead center position and then providing for movement of said second toggle lever relative to said actuating means.

RANKIN J. BUSH.